United States Patent Office 3,565,921
Patented Feb. 23, 1971

3,565,921
CONTINUOUS LIQUID PHASE HYDROGENATION PROCESS USING EXCESS HYDROGEN
Georges Gobron and Charles Brun, Melle, Deux-Sevres, France, assignors to Melle-Bezons, Melle, Deux-Sevres, France, a corporation of France
No Drawing. Filed Oct. 7, 1965, Ser. No. 493,876
Claims priority, application France, Jan. 6, 1965, 1,010
Int. Cl. C07c 5/04, 5/20, 87/36
U.S. Cl. 260—347.8                                  12 Claims

ABSTRACT OF THE DISCLOSURE

Process for catalytic hydrogenation in inert solvents in the liquid phase in which excess hydrogen passes through the reaction mixture to remove products as formed to prolong the life of the catalyst.

---

This invention relates to continuous hydrogenation processes, and more particularly, it relates to continuous hydrogenation of feed materials in the liquid phase.

The production of certain organic materials by the conventional liquid-phase catalytic hydrogenation process often results in difficulties due to instability of the starting material and/or instability of the finished product. Such instability results in poor yields and in the formation of undesired condensation products and polymers. Moreover, these undesired condensation products and polymers deposit on the surface of the catalyst and rapidly reduce its activity.

The principal object of this invention is to provide a liquid-phase catalytic hydrogenation process which gives good yields of the desired reaction products and a long catalyst life.

Further and more specific objects, features, and advantages will clearly appear from the detailed description given below.

Briefly, the hydrogenation process of this invention is carried out in the liquid phase in a bath of inert liquid which contains a hydrogenation catalyst. The substance to be hydrogenated is fed to the bath together with an excess of hydrogen sufficient simultaneously to entrain and remove substantially all of the liquid or gaseous reaction product as the product is formed, together with substantially all of the unreacted starting material resulting from the hydrogenation. The hydrogen may contain a minor proportion (up to 10% by volume) of one or more inert gases such as nitrogen or methane. The liquid is inert both to the reactants and to the products of the hydrogenation reaction and its boiling point under the operating conditions of the reaction is above the temperature at which the reaction is carried out. It has been found that this process gives the minimum risk of breakdown of the reactants or reaction products and further greatly diminishes, or even completely avoids, deposition of material on, and inactivation of, the catalyst.

It has further been found that the use of large excesses of hydrogen permits good dispersion and intermixing of the catalyst and the substance to be hydrogenated. A further advantage of the process of this invention is that the optimum temperature of the bath can easily be controlled within very narrow limits. In carrying out the process of this invention, it is preferred to introduce hydrogen at a rate which is at least about 300 times the volume of the bath in the reaction zone.

The liquid diluent, or reaction medium, through which the catalyst is dispersed, desirably has a boiling point at least 50° C. above the reaction temperature. This liquid diluent should further be stable under the operating conditions of the reaction. It has been found that a diluent with a boiling point above 200° C. is generally satisfactory in carrying out this invention. Desirable reaction media are hydrocarbons, alcohols, and esters, having the inertness and boiling points as set forth above. It will be understood that mixtures of the hydrocarbons, alcohols, or esters can also be used.

The specific reaction conditions, such as reaction temperature hydrogen feed rate, volume of the bath, and the like, are chosen according to the particular type of material which is to be hydrogenated.

The apparatus itself can comprise a reactor provided with a heater and conduits for introducing hydrogen and the hydrogenatable substance into the reaction zone. For example, the reactor can be surmounted by a column fitted with a condenser and the necessary pipes required to withdraw the product and to reflux excess condensate to the top of the column.

The hydrogen feed pipe will preferably open into the bottom of the reactor so that a uniform dispersion of the hydrogen throughout the reaction zone can be ensured by a suitable device, such as an agitator, perforated plate, porous plate, or the like. The conduit through which the substance to be hydrogenated is injected into the reactor vessel preferably opens as near as possible to the hydrogen feed point at the bottom of the reactor. With this equipment arrangement the hydrogenatable substance will automatically and immediately be dispersed throughout the bath by the stream of hydrogen.

It will be understood that the process of this invention can be carried out at a pressure other than atmospheric.

It will be understood that the process of this invention is broadly applicable to hydrogenatable materials. It is especially suitable for the hydrogenation of aliphatic and cyclic materials including aromatic and aliphatic-aromatic materials, carbonylic materials, and nitro compounds. For example, this process is useful in hydrogenating aldehydes to obtain the corresponding alcohols, aromatics to obtain corresponding alicyclics, unsaturated hydrocarbons to the corresponding saturated hydrocarbons, and nitro groups to primary amines.

The following examples are given to illustrate preferred embodiments of this invention as it is now preferred to practice it. It will be understood that the examples are illustrative, and the invention is not to be considered as restricted thereto except as indicated in the appended claims.

EXAMPLE I

Three liters of 2-ethylhexyl-2-ethylhexanoate containing 300 g. of finely divided copper catalyst suspended therein is introduced into a cylindrical reactor having a diameter of 55 mm. and a height of 4 m. The catalyst-containing hexanoate bath is brought to and maintained at a temperature of 178° C. and 300 g./hr. liquid furfural and 3.5 cubic meters/hr. hydrogen are continuously introduced into the reactor, the hydrogen serving to remove the products of the reaction as they are formed.

The reactor is surmounted by a 2-meter high packed column fitted with a condenser at the head of the column. An amount of reaction product corresponding to the amount of furfural fed is withdrawn from the condenser and the remainder of the condensate is refluxed to the top of the column to maintain the high-boiling ester in the reactor and to maintain a constant reaction bath volume.

Under these operating conditions 305 g./hr. of a mixture consisting of 15 g. furfural, 287 g. of furfuryl alcohol and 3 g. of high-boiling by-products is produced. This represents a total conversion of furfural of 95%, and a 99% yield of furfuryl alcohol based on the amount of furfural converted.

As proof that the catalyst activity remains at its original high level, after 300 hours of running under operating conditions, exactly the same percentage conversion and yields are obtained.

EXAMPLE II

Three liters of 2-ethylhexyl-2-ethylhexanoate containing 300 g. of finely divided nickel catalyst suspended therein is introduced into a cylindrical reactor having a diameter of 55 mm. and a height of 4 m. The catalyst-containing hexanoate bath is brought to and maintained at a temperature of 175° C., while 230 g./hr. aniline and 4.2 cubic meters/hr. hydrogen are continuously fed to the reactor, the hydrogen being introduced at the bottom of the reactor and serving to remove the products of the reaction as formed.

The reactor is surmounted by a 2-meter high packed column fitted with a water-cooled condenser at the head of the column. In series with the water-cooled condenser is a brine-cooled condenser. The cyclohexylamine is condensed and withdrawn from the top of the column, while the remaining condensate is refluxed to obtain unreacted aniline and dicyclohexylamine at the base of the column, from whence they are removed.

Under these operating conditions 86.5% of the aniline is converted to cyclohexylamine and only 7% is converted to dicyclohexylamine. The unconverted aniline amounts to 4.7%.

Example II thus illustrates a considerable improvement over prior art processes. The former vapor phase hydrogenation of aniline at atmospheric pressure produced, in addition to the cyclohexylamine, large quantities of dicyclohexylamine as well as phenylcyclohexylamine. The prior art liquid-phase hydrogenation processes operated under hydrogen pressures of 100 to 400 atmospheres to obtain cyclohexylamine yields of about 80%.

By contrast, the process of this invention permits a liquid-phase hydrogenation at atmospheric pressure to obtain good cyclohexylamine yields. This is apparently due to rapid removal of the cyclohexylamine from contact with the catalyst in the bath. Thus, the concentration of cyclohexylamine is low and the dicyclohexylamine formation is low.

EXAMPLE III

Into a cylindrical reactor identical with that of Example I there is introduced a reaction bath consisting of 320 g. of finely divided nickel catalyst suspended in 3 liters of a hydrocarbon fraction containing about 80% by weight of pentadecane, about 10% by weight of tetradecane and about 10% by weight of hexadecane. This hydrocarbon fraction, at atmospheric pressure, distils off from about 255° to about 285° C. The catalytic bath is brought to and maintained at a temperature of 160° C. C. and 196 g./hr. liquid furfuryl alcohol and 4.5 cubic meters/hr. impure hydrogen containing 5% by volume of inert gases (nitrogen and methane) are continuously introduced into the reactor.

The reactor, like that in Examples I et II, is surmounted by a 2-meter high packed column fitted with a condenser at the head of the column. An amount of reaction product corresponding to the amount of furfuryl alcohol fed is withdrawn from the condenser and the remainder of the condensate is refluxed to the top of the column to maintain the high-boiling diluent mixture in the reactor and to maintain a constant reaction bath volume.

All the apparatus is maintained at an overpressure of 0.5 kg./cm.$^2$.

Under these operating conditions 202 g./hr. of a reaction product consisting of 1.76 mole of tetrahydrofurfuryl alcohol and 22 g. of a mixture of aliphatic alcohols and diols (resulting from the breakage of the furfuryl nucleus), methylfurane and furfuryl alcohol. The amount of unconverted furfuryl alcohol is about one gram.

The tetrahydrofurfuryl alcohol yield amounts to 88% based on the amount of furfuryl alcohol converted.

What is claimed is:

1. In a continuous liquid-phase hydrogenation process wherein liquid or gaseous reaction products are produced, wherein the hydrogenation effects conversion of aldehydes to the corresponding alcohols, aromatic compounds to the corresponding alicyclic compounds, unsaturated hydrocarbons to the corresponding saturated hydrocarbons, or nitro compounds to the corresponding amines, and wherein hydrogen is fed in stoichiometric excess to the reaction bath at a rate sufficient simultaneously to entrain and remove substantially all of the liquid or gaseous reaction products as formed, the improvement which comprises introducing the hydrogen and the compound to be hydrogenated into a bath containing a solid hydrogenation catalyst in a reaction inert liquid which is stable under the operating conditions of the reaction, said liquid having a boiling point above the temperature at which the hydrogenation process is conducted.

2. The method of claim 1 wherein the rate of hydrogen introduced is not less than 0.3 cubic meter per hour per liter of bath.

3. The method according to claim 1 wherein said liquid boils at least 50° C. above the reaction temperature.

4. The method of claim 1 wherein the inert liquid has a boiling point above about 200° C.

5. The method of claim 1 wherein the inert liquid is a hydrocarbon, alcohol or ester.

6. The method of claim 1 wherein the inert liquid is 2-ethyl hexyl-2-ethylhexanoate.

7. The method of claim 6 wherein the substance to be hydrogenated is furfural.

8. The method of claim 7 wherein the catalyst is a copper hydrogenation catalyst, said bath is maintained at about 178° C. and the amount of hydrogen fed is at least about 300 times per hour the volume of the bath.

9. The method of claim 6 wherein the substance to be hydrogenated is aniline.

10. The method of claim 9 wherein the catalyst is a nickel hydrogenation catalyst, said bath is maintained at about 175° C. and the amount of hydrogen fed is at least about 300 times per hour the volume of the bath.

11. The method of claim 1 wherein the inert liquid is a mixture of hydrogen containing about 80% by weight of pentadecane, about 10% by weight of tetradecane and about 10% by weight of hexadecane, and the substance to be hydrogenated is furfuryl alcohol.

12. The method according to claim 11 wherein the catalyst is a nickel hydrogenation catalyst, the bath is maintained at about 160° C. and the amount of hydrogen fed is at least about 300 times per hour the volume of the bath.

References Cited

UNITED STATES PATENTS

| | | | |
|---|---|---|---|
| 2,983,734 | 5/1961 | Sargent | 260—347.8 |
| 2,487,054 | 11/1949 | Howk | 260—345 |
| 3,117,992 | 1/1964 | Duggan | 260—563 |

OTHER REFERENCES

Paul, C. A. 31: 8529 (December 1937).
Mizuguchi, C. A. 42: 6802-3 (September 1948).
British Pat. No. 780,275, C. A. 20196-7 (November 1958).
Sultanov, C.A. 53: 14077-8 (August 1959).
Sultanov, C.A. 56: 7280 (April 1962).
Sultanov, C.A. 60: 14458 (June 1964).
Adkins, Reactions of Hydrogen (U. of Wisconsin Press, Madison, Wis., 1937), pp. 25–28, 62–64.

HENRY R. JILES, Primary Examiner

C. M. SHURKO, Assistant Examiner

U.S. Cl. X.R.

260—346.1, 568, 580, 583, 563, 618, 632, 635, 638, 667, 683.9, 690